(12) United States Patent
Gattone

(10) Patent No.: US 6,612,796 B2
(45) Date of Patent: *Sep. 2, 2003

(54) PUSH-IN FASTENER ASSEMBLY WITH INTERFERING ELEMENT

(75) Inventor: Michael T. Gattone, Oak Forest, IL (US)

(73) Assignee: Illinois Tool Works, Inc., Glenview, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 09/998,065

(22) Filed: Nov. 30, 2001

(65) Prior Publication Data

US 2002/0067974 A1 Jun. 6, 2002

Related U.S. Application Data

(63) Continuation-in-part of application No. 09/728,400, filed on Dec. 1, 2000.

(51) Int. Cl.[7] .................................................. F16B 21/18
(52) U.S. Cl. ........................ 411/520; 411/527; 411/182; 403/135
(58) Field of Search .................. 411/970, 520–527, 411/183, 182, 437, 433; 403/122, 135

(56) References Cited

U.S. PATENT DOCUMENTS

| | | | | |
|---|---|---|---|---|
| 2,156,003 | A | * | 4/1939 | Tinnerman |
| 2,539,172 | A | * | 1/1951 | Andrews |
| 3,007,726 | A | * | 11/1961 | Parkin |
| 3,027,670 | A | * | 4/1962 | Kramer |
| 3,139,768 | A | * | 7/1964 | Biesecker |
| 3,226,145 | A | * | 12/1965 | Goldberg |
| 6,231,223 | B1 | | 5/2001 | Zucar et al. |
| 6,361,261 | B1 | * | 3/2002 | Gattone |
| 6,379,093 | B1 | * | 4/2002 | Bondarowicz |

* cited by examiner

Primary Examiner—Flemming Saether
(74) Attorney, Agent, or Firm—Pitney, Hardin Kipp & Szuch LLP

(57) ABSTRACT

The fastener includes a post element, a blind aperture assembly with a blind aperture into which the post element is inserted, and a rigid fastening member. The rigid fastening member includes a lower helical edge with an inwardly extending lip which threadably engages the external threads formed on the post. The inclined rotationally symmetric wall deflects upon insertion into the blind aperture, but then interferes with the walls of the blind aperture to resist withdrawal.

15 Claims, 5 Drawing Sheets

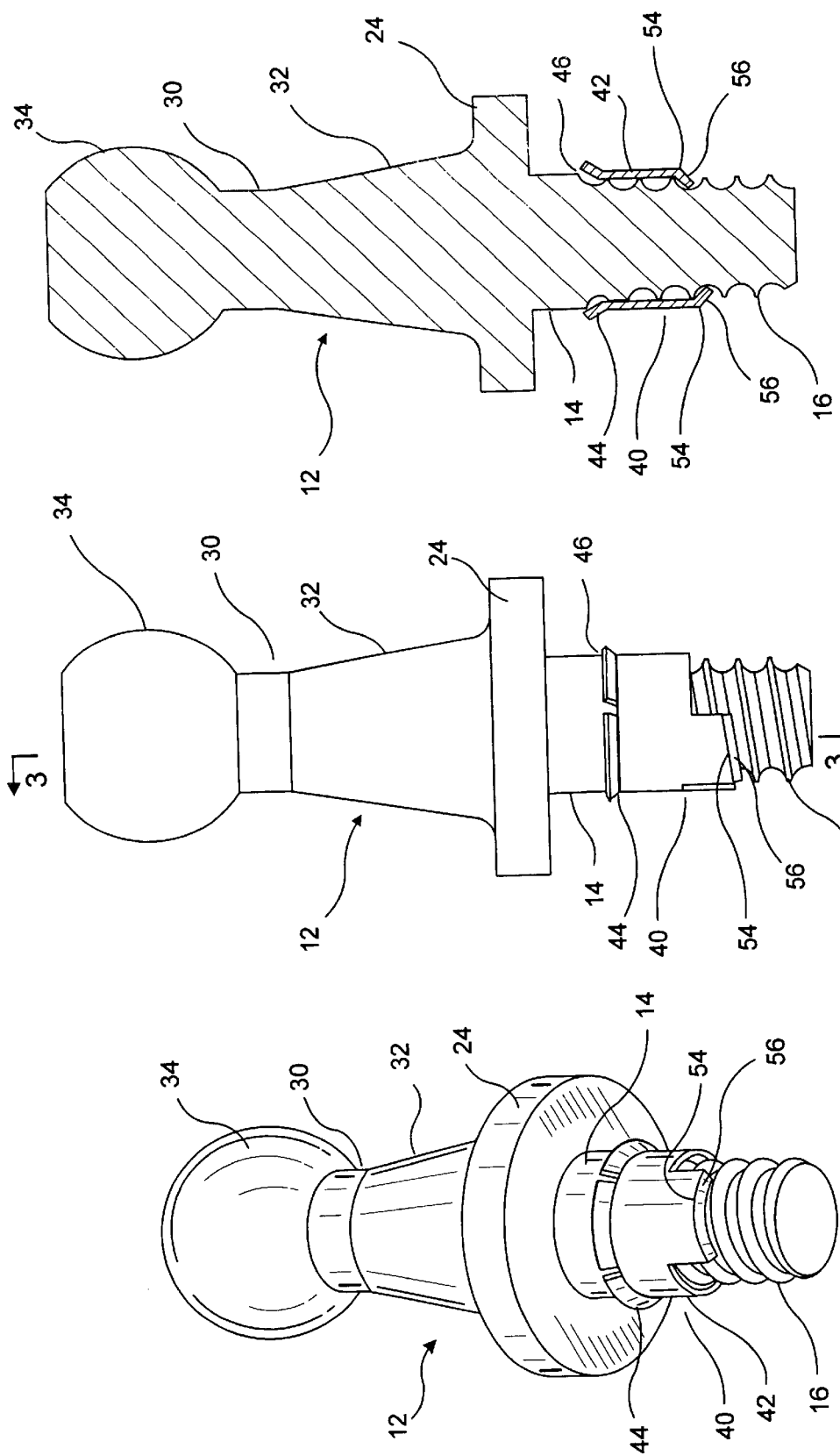

PUSH-IN FASTENER ASSEMBLY WITH INTERFERING ELEMENT

This application is a continuation-in-part of application Ser. No. 09/728,400, entitled "Push-In Fastener Assembly", filed on Dec. 1, 2000, the disclosure of which is hereby incorporated by reference.

BACKGROUND OF THE INVENTION

1. Field of the Invention

This invention pertains to a push-in fastener assembly. The fastener assembly includes a post with external threading to which a rigid fastener member is threadedly engaged. The post and rigid fastener member are inserted into a blind aperture. The rigid member fastening member flexes and interferes with the blind aperture by way of an oblique rotationally symmetric wall.

2. Description of the Prior Art

In the prior art, fasteners for plastic panels are known. However, many of these fasteners are deficient when used with apertures formed in softer plastics which can be scooped or gouged by the fastener. Additionally, many of these fasteners have required complicated installation procedures which increased installation costs.

Additionally, while the apparatus of the parent application has been satisfactory in all respects, it is desired in some applications to increase the pull-out strength of the connection.

Moreover, prior art techniques have mounted head lamp reflectors by using ball sockets which were attached by screws to the rear of the brittle, thermal set head lamp reflectors. This has resulted in an unwieldy, unsatisfactory installation procedure.

Some examples of fasteners are disclosed in U.S. Pat. No. 6,231,223 entitled "Intermediate Fastening Element for Fitting a Reflector on a Support Element of a Headlamp" issued on May 15, 2001 to Zucar et al.; U.S. Pat. No. 6,152,667 entitled "Blind Aperture Fastener" issued on Jul. 18, 2000 to LeVey; U.S. Pat. No. 5,522,635 entitled "Tonneau Cover and Frame for Pick-Up Trucks" issued on Jun. 4, 1996 to Downey; U.S. Pat. No. 5,469,606 entitled "Clamp Means for Joining Objects Together" issued on Nov. 28, 1995 to Hansen; U.S. Pat. No. 5,098,242 entitled "Plastic Fastener for Threaded Stud" issued on Mar. 24, 1992 to Schaty; U.S. Pat. Nos. 4,750,878 and 4,624,585, both entitled "Retainer Bushing" issued on Jun. 14, 1988 and Nov. 25, 1986, respectively, to Nix et al.; U.S. Pat. No. 3,551,963 entitled "Self-Locking Snap Fastener" and issued on Aug. 16, 1968 to Mosher, Jr. et al.; U.S. Pat. No. 1,849,604 entitled "Fastening and Connecting Device" issued on Aug. 1, 1929 to Weatherhead, Jr.; and U.S. Pat. No. 207,871 entitled "Elastic Packing for Pistons" issued on Sep. 10, 1878 to Horton et al.

OBJECTS AND SUMMARY OF THE INVENTION

It is therefore an object of the present invention to provide a fastener assembly which can be used with softer plastics with minimized gouging or scooping of the plastic.

It is therefore a further object of the present invention to provide a fastener assembly which can be installed with a simple motion thereby resulting in reduced installation costs.

It is therefore a still further object of the present invention to provide a fastener assembly which fastens securely.

It is therefore a still further object of the present invention to provide a fastener assembly which can be manufactured economically.

It is therefore a still further object of the present invention to provide a fastener assembly with increased strength.

It is therefore a still further object of the present invention to provide a fastener assembly which can achieve the above objects and may be adapted to include a push-in attachment style ball socket, such as for the mounting of automotive head lamp reflectors.

These and other objects are attained by providing a fastener with a post which includes external threads. The external threads engage a rigid fastening member. The rigid fastening member, which is preferably metallic, includes a lower inwardly extending lip with a helical configuration to properly engage the external threads. The upper portion of the rigid fastening member includes an oblique rotationally symmetric wall which interferes with the blind aperture. The oblique rotationally symmetric wall is configured so that the lesser diameter oriented in the direction of insertion of the post into the blind aperture. Therefore, instead of gouging or scooping the walls of the blind aperture, there is a controlled predictable deflection of the oblique rotationally symmetric wall of the rigid member against the walls of the blind aperture of the blind aperture assembly.

A further aspect of the present invention includes the above structure and further includes a push-in attachment style ball socket. This further aspect of the present invention is particularly adapted to the mounting of automotive head lamp reflectors.

BRIEF DESCRIPTION OF THE DRAWINGS

Further objects and advantages will become apparent from the following description and claims, and from the accompanying drawings, wherein:

FIG. 1 is a perspective view of the post of the fastener assembly of the present invention, shown with the rigid fastening member engaged therewith.

FIG. 2 is a side plan view of the post of the fastener assembly of the present invention, shown with the rigid fastening member engaged therewith.

FIG. 3 is a cross-sectional view of the post and rigid fastening member of the present invention, along plane 3—3 of FIG. 2.

DETAILED DESCRIPTION OF THE PREFERRED EMBODIMENT

At the outset, the disclosure of parent application Ser. No. 09/728,400, entitled "Push-In Fastener Assembly", filed on Dec. 1, 2000, is hereby incorporated by reference.

Figure 6:
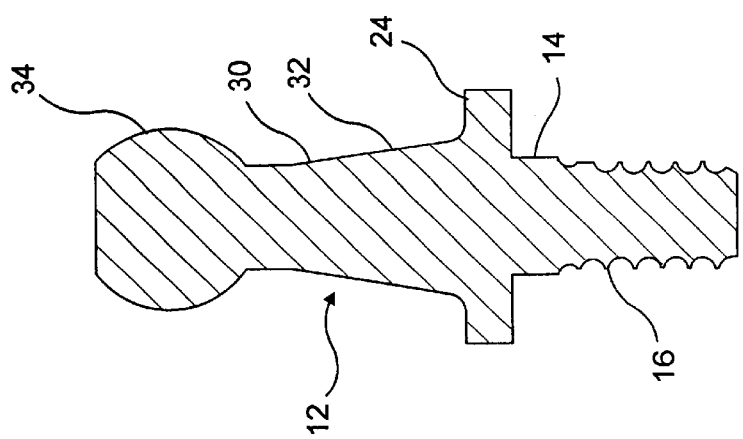
FIG. 6 is a cross-sectional view of the post of fastener assembly of the present invention, along plane 6—6 of FIG. 5.
Figure 5:
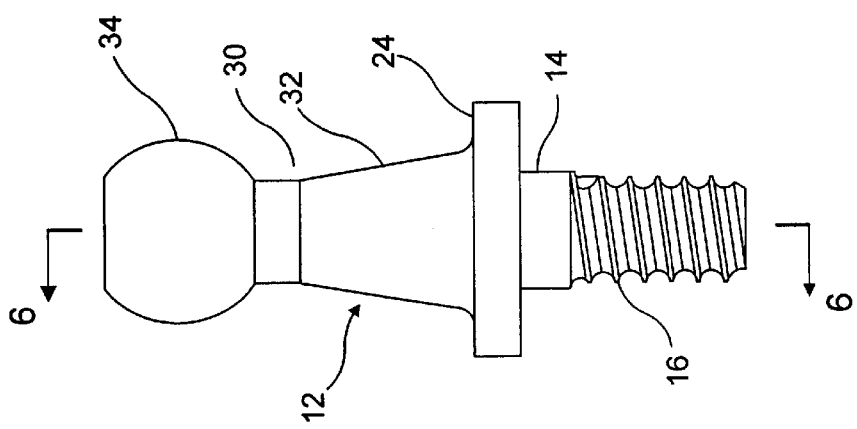
FIG. 5 is a side plan view of the post of the fastener assembly of the present invention.
Figure 4:
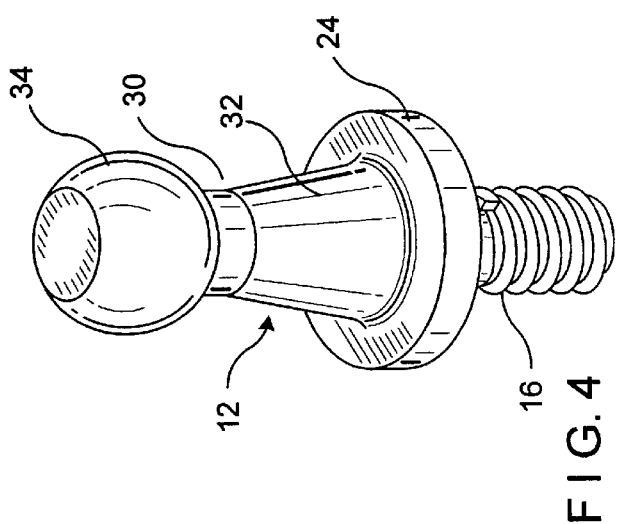
FIG. 4 is a perspective view of the post of the fastener assembly of the present invention.
Figure 7:
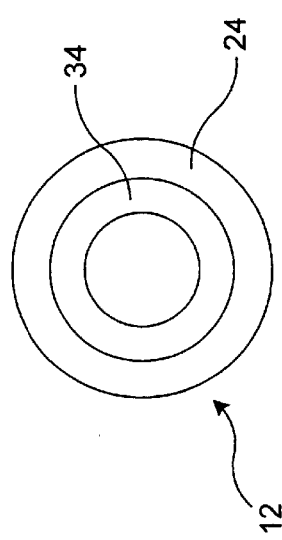
FIG. 7 is a top plan view of the post of the fastener assembly of the present invention.
Figure 10:
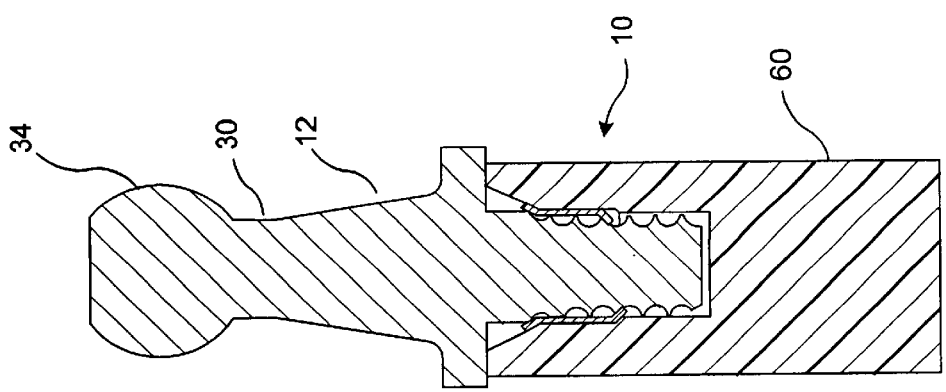
FIG. 10 is a cross-sectional view of the fastener assembly of the present invention, along plane 10—10 of FIG. 9.
Figure 9:
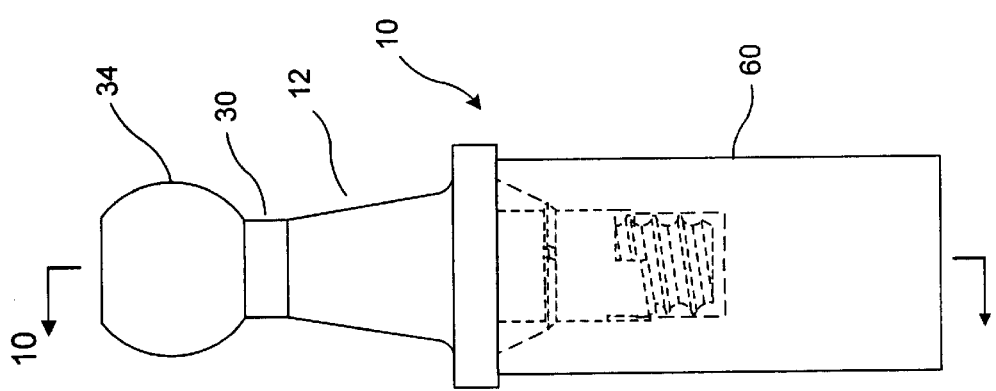
FIG. 9 is a plan view, partially in phantom, of the fastener assembly of the present invention, shown in the installed configuration.
Figure 8:
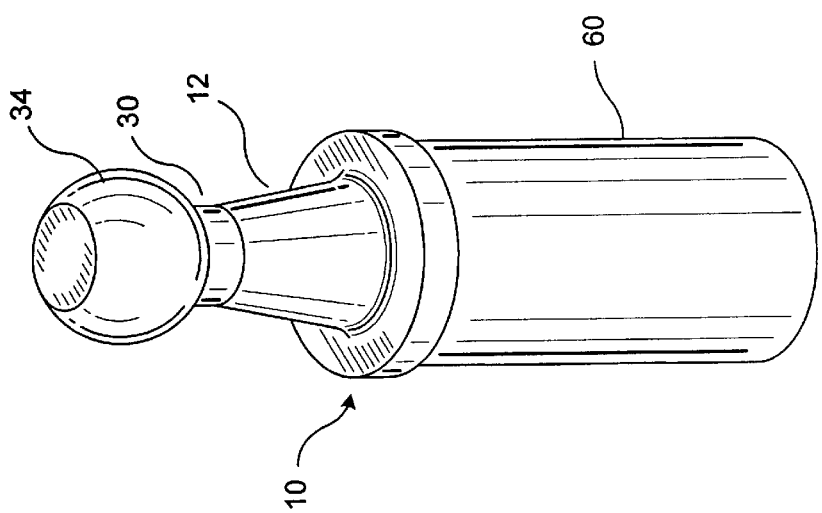
FIG. 8 is a perspective view of the fastener assembly of the present invention, shown in the installed configuration.

Referring now to the drawings in detail wherein like numerals refer to like elements throughout the several views, one sees that FIGS. 1–7 illustrate the post 12 of fastener assembly 10, while FIGS. 8–10 illustrate the fastener assembly 10 in the coupled configuration.

Post 12 includes a lower cylindrical portion 14 with external threads 16 formed thereon. Cylindrical disk 24 is formed above lower cylindrical portion 14 and serves as a stop for the insertion of post 12, as will be explained hereinafter.

Handle portion 30 is formed above cylindrical disk 24 and includes tapered rotationally symmetric stem 32 and knob 34.

Post 12 is typically an integral piece made from such materials as 30% glass filled polypropylene, nylon 6/6, or 33% glass filled nylon, although those skilled in the art will recognize that a range of equivalents is available.

As shown in FIGS. 1–3, rigid fastening member 40 is threadedly secured onto external threads 16 of post 12. Rigid fastening member 40 includes cylindrical wall 42 with upper outwardly flaring oblique rotationally symmetric wall 44. Upper outwardly flaring oblique rotationally symmetric wall 44 forms mouth 46 therewithin. Upper outwardly flaring oblique rotationally symmetric wall 44 is angled so that the largest diameter opening is presented at mouth 46, with the diameter progressively decreasing to the diameter of the interior of cylindrical wall 42.

Cylindrical wall 42 includes inclined lower edge 54 which is helically formed with an angle of inclination matching that of external threads 16. Inclined lower edge 54 further includes inwardly turned lip 56. The resulting helical orientation of inwardly turned lip 56 allows rigid fastening member 40 to be threaded onto external threads 16 of post 14 to achieve the configuration shown in FIGS. 1–3. This is a simple operation which results in a very strong connection between rigid fastening member 40 and post 16 with respect to linear pull-out forces parallel to the longitudinal or rotational axis of post 12.

Rigid fastening member 40 is primarily envisioned as being made by eyelet manufacturing equipment using 300 series stainless steel. Carbon steel, if plated to guard against corrosion, and if necessary, heat treated, could similarly be substituted for the stainless steel. For applications requiring a lower minimum pull-out force, plastics or some engineering grade polymers could even be substituted.

Figure 12:
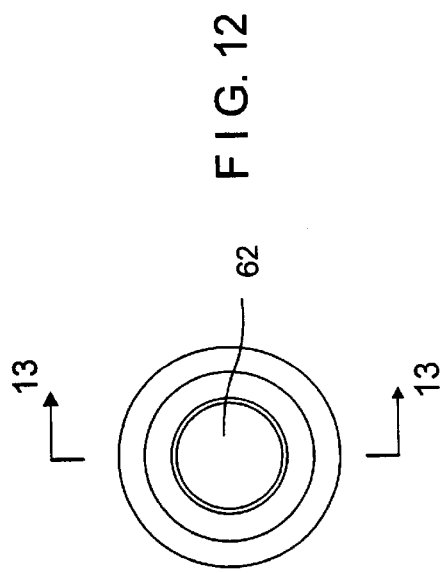
FIG. 12 is a front plan view of the blind aperture assembly of the fastener assembly of the present invention.
Figure 13:
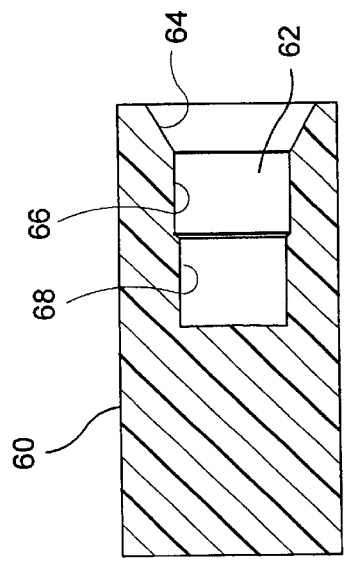
FIG. 13 is a cross-sectional view of the blind aperture assembly of the fastener assembly of the present invention, along plane 13—13 of FIG. 12.
Figure 11:
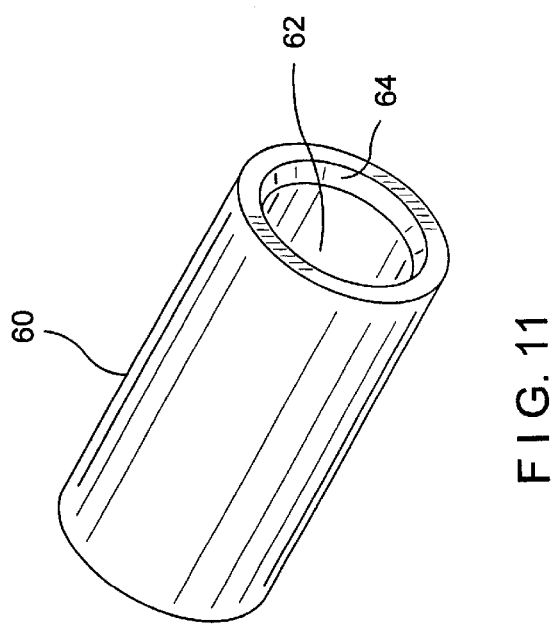
FIG. 11 is a perspective view of a blind aperture assembly of the fastener assembly of the present invention.

Blind aperture assembly 60 is shown in FIGS. 11–13. Blind aperture assembly 60 is typically formed of polypropylene, such as 20% talc filled polypropylene, but can also be made of such materials as polycarbonate, nylon, thermoplastic or other equivalent material. Blind aperture 62 is formed within blind aperture assembly 60. Blind aperture 62 includes, sequentially, countersunk mouth 64, portion of first diameter 66, and portion of second diameter 68, wherein first diameter is somewhat larger than second diameter. A typical configuration which illustrates a typical relationship between the first and second diameters is first diameter being equal to 6.9 mm. and second diameter being equal to 6.75 mm. with the total depth of blind aperture 62 being 11.0 mm. Those skilled in the art, of course, will recognize other configurations for the various applications of fastener 10.

As shown in FIGS. 8–10, in the installed configuration, rigid fastening member 40 is threadedly installed on lower cylindrical portion 14 of post 12, and lower cylindrical portion 14 is inserted into blind aperture 62 of blind aperture assembly 40. Rigid fastening member 40 interferes against the walls of blind aperture 62 thereby securing post 12 to blind aperture assembly 60.

Upper outwardly flaring oblique rotationally symmetric wall 44 is relatively easily inserted into blind aperture 62 without scooping or gouging the material of blind aperture assembly 60. However, due to the angle of inclination of upper outwardly flaring oblique rotationally symmetric wall 44 with respect to a projection of cylindrical wall 42, upper outwardly flaring oblique rotationally symmetric wall 44 interferes with blind aperture 62 and resists being pulled out of blind aperture 62 after insertion therewithin. The angle of upper outwardly flaring oblique rotationally symmetric wall 44 can be reduced if stiffer material is used with the blind aperture assembly 60 or if a lesser minimum pull-out force is required. Typically, a range of about 15–75° is envisioned depending upon the application. Additionally, the upper outwardly flaring oblique rotationally symmetric wall 44 does not necessarily have to be a full diameter, but alternately can be formed as segments as shown in FIG. 1. That provides an alternate way to control insertion and removal force.

To use this embodiment of fastener assembly 10, the user first inserts post 12 into mouth 46 of rigid fastening member 40 and threadably engages inwardly turned lip 56 of rigid fastening member 40 onto external threads 16 of post 12. The user then inserts post 12 with rigid fastening member 40 attached thereto into blind aperture 62 of blind aperture assembly 60 until cylindrical disk 24 is flush with either blind aperture assembly 60 or an apertured panel engaged therebetween (not shown). Upper outwardly flaring oblique rotationally symmetric wall 56 deflects somewhat during insertion but thereafter interferes with the walls of blind aperture 62 thereby securing post 12 within blind aperture assembly 60.

Figure 15:
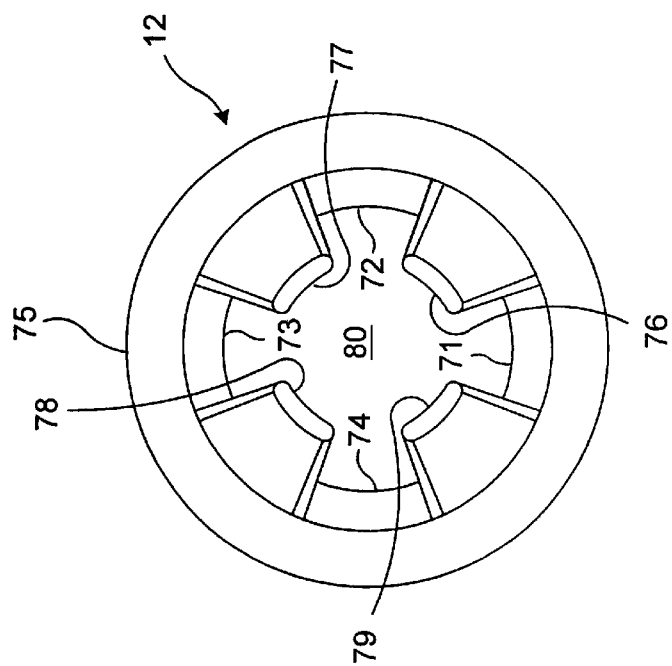
FIG. 15 is a top plan view of the alternative embodiment of the post of the fastener assembly of the present invention.
Figure 14:
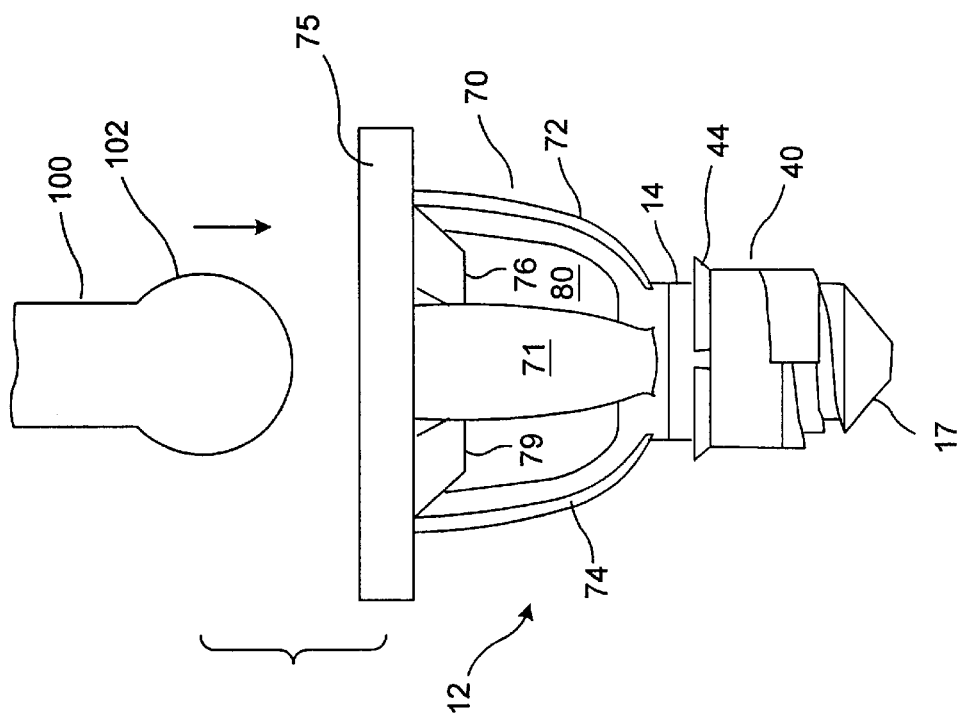
FIG. 14 is a side plan view of an alternative embodiment of the post and rigid fastening member of the fastener assembly of the present invention, shown with a push-in attachment ball socket and further shown with an external ball socket element directed to engagement therewith.

FIGS. 14 and 15 illustrate an alternative embodiment of post 12 of fastener 10. This alternative embodiment includes a similar cylindrical post 14 with external threads 16 (including tapered end 17) and rigid fastening member 40. However, the cylindrical disk 24 and handle 30 are replaced by a push-in ball socket assembly 70. The structure of the push-in ball socket assembly 70 is very similar to that disclosed in U.S. Pat. No. 6,231,223, the contents of which are hereby incorporated by reference. Four arcuate support arms 71, 72, 73, 74 rise from cylindrical portion 14 to support ring 75. Elastic locking tongues 76, 77, 78, 79 extend downwardly from ring 75. Nesting cavity 80, which forms a ball socket, is formed between support arms 71, 72, 73, 74 and elastic locking tongues 76, 77, 78, 79. Elastic locking tongues 76, 77, 78, 79 are constructed and arranged such that an external spherical ball 102 mounted on a mounting element 100 will urge elastic locking tongues 76, 77, 78, 79 downwardly and apart so that external spherical ball 102 can pass through ring 75 and into the ball socket formed by nesting cavity 80. However, elastic locking tongues 76, 77, 78, 79 will lock external spherical ball 102 within nesting cavity 80 and not allow the withdrawal of external spherical ball 102. A typical configuration and application of this alternative embodiment is to have blind aperture assembly 60 incorporated into the rear of thermal set head lamp reflectors such as is used in automotive applications. In other words, an appropriate blind aperture is formed in the head lamp reflector. Post 12 with rigid fastening member 40 threadably attached thereto is inserted into the blind aperture. The mounting element 100 with spherical ball 102 is attached to an appropriate portion of the automotive vehicle (not shown), and the push-in ball socket assembly 70 is aligned and urged to engage the spherical ball 102 as described above.

Thus the several aforementioned objects and advantages are most effectively attained. Although preferred embodiments of the invention have been disclosed and described in detail herein, it should be understood that this invention is in no sense limited thereby and its scope is to be determined by that of the appended claims.

What is claimed is:

1. A fastener assembly including:

a post element;

an aperture assembly element with an aperture therein said aperture including an oblique walled port, said post element being inserted into said aperture in an installed position;

an interference element which threadedly engages to said post element, said interference element including a body substantially parallel to said post element, said body including a first end which includes an oblique wall forming a mouth with a diameter which progressively decreases to a diameter of an interior of said body, all of said oblique wall being positioned within said aperture and said oblique wall interfering with walls of said aperture thereby resisting withdrawal from said aperture.

2. The fastener assembly of claim 1 wherein said post element includes external threads and wherein said interference element engages said external threads.

3. The fastener assembly of claim 2 wherein said interference element includes a lower edge, at least a portion of which is inclined thereby forming a helical shape, said lower edge further including an inwardly directly lip which engages said external threads.

4. A fastener assembly including:

a post element;

an aperture assembly element with an aperture therein, said post element being inserted into said aperture in an installed position;

an interference element which threadedly engages to said post element, said interference element including a body substantially parallel to said post element, said body including a first end which includes an oblique wall forming a mouth with a diameter which progressively decreases to a diameter of an interior of said body, said oblique wall interfering with walls of said aperture thereby resisting withdrawal from said aperture; and wherein said post, said aperture, and said body are substantially cylindrical, and said oblique wall is rotationally symmetric.

5. The fastener assembly of claim 4 wherein said oblique wall forms an angle with respect to a projection of said body in a range of 15–75°.

6. The fastener assembly of claim 5 wherein said aperture is a blind aperture.

7. The fastener assembly of claim 6 wherein said post includes a handle portion.

8. The fastener assembly of claim 7 wherein said post includes a cylindrical disk substantially perpendicular thereto.

9. The fastener assembly of claim 8 wherein said post is made of plastic.

10. The fastener assembly of claim 8 wherein said post is made of 30% glass filled polypropylene.

11. The fastener assembly of claim 8 wherein said interference element is made of stainless steel.

12. The fastener assembly of claim 8 wherein said aperture assembly element is made of polypropylene.

13. The fastener assembly of claim 4 wherein said post element includes a first end and a second end, wherein said external threads are formed on said first end and a ball socket assembly is formed on said second end.

14. The fastener assembly of claim 13 wherein said ball socket assembly includes a ring supported by support arms, wherein a ball socket cavity is formed between said support arms and said ring.

15. The fastener assembly of claim 14 further including locking tongues extending from said ring into said ball socket cavity, whereby said locking tongues are urged apart by insertion of a ball element through said ring thereby allowing the ball element to enter into said ball socket cavity and whereby said locking tongues resist a subsequent withdrawal of the ball element from said ball socket cavity.

* * * * *